(12) United States Patent
Katz

(10) Patent No.: US 6,356,816 B1
(45) Date of Patent: Mar. 12, 2002

(54) METHOD AND APPARATUS FOR REDUCING DRAG IN MARINE VESSELS

(75) Inventor: Richard A. Katz, East Lyme, CT (US)

(73) Assignee: The United States of America as represented by the Secretary of the Navy, Washington, DC (US)

(*) Notice: Subject to any disclaimer, the term of this patent is extended or adjusted under 35 U.S.C. 154(b) by 0 days.

(21) Appl. No.: 09/663,422

(22) Filed: Sep. 15, 2000

(51) Int. Cl.⁷ .............................. B64C 23/00; B63B 1/38
(52) U.S. Cl. .................. 701/21; 701/116; 244/204; 114/67 A
(58) Field of Search .................. 701/21, 116; 244/130, 244/204, 206, 201; 114/67 R, 67 A

(56) References Cited

U.S. PATENT DOCUMENTS

| | | | | |
|---|---|---|---|---|
| 4,991,529 A | * | 2/1991 | McKune et al. | 114/67 R |
| 5,117,882 A | * | 6/1992 | Stanford | 144/67 A |
| 5,146,863 A | * | 9/1992 | Ford | 114/67 A |
| 5,365,490 A | * | 11/1994 | Katz | 367/1 |
| 5,575,232 A | * | 11/1996 | Kato et al. | 114/67 A |
| 5,603,278 A | * | 2/1997 | Nedderman et al. | 114/67 R |
| 5,704,750 A | * | 1/1998 | Bartos et al. | 411/411 |
| 5,803,409 A | * | 9/1998 | Keefe | 244/206 |
| 5,967,071 A | * | 10/1999 | Wipper | 114/67 A |

* cited by examiner

*Primary Examiner*—Tan Nguyen
(74) *Attorney, Agent, or Firm*—Michael J. McGowan; Prithvi C. Lall; Michael F. Oglo

(57) ABSTRACT

A system is disclosed that applies non-linear signal processing methods derived from theories of information and non-linear oscillations (chaos) to control the turbulent boundary layer of marine vessels in order to reduce the drag to which the vessels encountered while moving in water. The system uses measurement probes mounted along the hull of a marine vessel to provide detection markers for increase or decrease in the drag based on a prescribed fluid (i.e., air) injection and flow rate in boundary layer. The invention utilizes a differential radius (DR) to determine the minimum entropy for a given flow rate in the boundary layer which defines the optimum condition used by the system for reducing drag.

20 Claims, 3 Drawing Sheets

METHOD AND APPARATUS FOR REDUCING DRAG IN MARINE VESSELS

STATEMENT OF GOVERNMENT INTEREST

The invention described herein may be manufactured and used by or for the Government of the United States of America for governmental purposes without the payment of any royalties thereon or therefor.

BACKGROUND OF THE INVENTION (1) Field of the Invention

The present invention relates to marine vessels, and more particularly, to a system and method of operation thereof for reducing drag that retards the motion of marine vessels.

(2) Description of the Prior Art

Marine vessels that move in water experience drag that retards their motion therein. The drag is manifested as a turbulent boundary layer of the fluid that comes into contact with the marine vessel. A number of techniques have been proposed for reducing drag within the turbulent boundary layer. Examples include suction of the boundary layer fluid, injection of fluids into the boundary layer, use of electromagnetic force and other various means. Systems that reduce drag are known and some of which are described in U.S. Pat. Nos. 4,991,529; 5,117,882; 5,146,863; 5,365,490; 5,575,232; 5,603,278; 5,613,456; 5,704,750; and 5,803,409. However, several limitations remain using these approaches with respect to translation of applied technologies to practical applications. It is desired that a system and a method of operation thereof, be provided that reduces drag and finds practical applications to marine vessels.

SUMMARY OF THE INVENTION

Accordingly, it is a general purpose and object of the present invention to provide a system and method of operation thereof, that reduces drag in marine vessels and which is applicable to any situation which requires monitoring and regulation of boundary layered dynamics and applies to all marine vessels. The present invention minimizes the marine vessel drag and thereby maximizes the vessel's fuel consumption efficiency.

The system of the present invention comprises an air flow system, a plurality of sensors, and a signal processor that is responsive to application programs. The air flow system is coupled to the boundary layer of the fluid that comes into contact with the marine vessel. The air flow system is responsive for means for varying bubble size interjected into a fluid of the boundary layer and means for varying the flow rate of the fluid interjected into the boundary layer. The means for varying comprises the plurality of sensors, each having an output and interposed in the boundary layer. The sensors detect the flow rate of the boundary layer and the pressure thereof and the information derived from the sensors is used to determine the size of bubbles flowing in the boundary layer. The signal processor receives the output of the sensors and is responsive to the application programs which determine the time rate of change of a chaotic radius (CR) which represents the differential radius (DR) having a range which controls the bubble size and the flow rate injected into the boundary layer.

BRIEF DESCRIPTION OF THE DRAWINGS

A more complete understanding of the invention and many of the attendant advantages thereto will be readily appreciated as the same becomes better understood by reference to the following detailed description when considered in conjunction with the accompanying drawings wherein corresponding reference characters indicate corresponding parts throughout the several views of the drawings and wherein.

DESCRIPTION OF THE PREFERRED EMBODIMENTS

Figure 1:
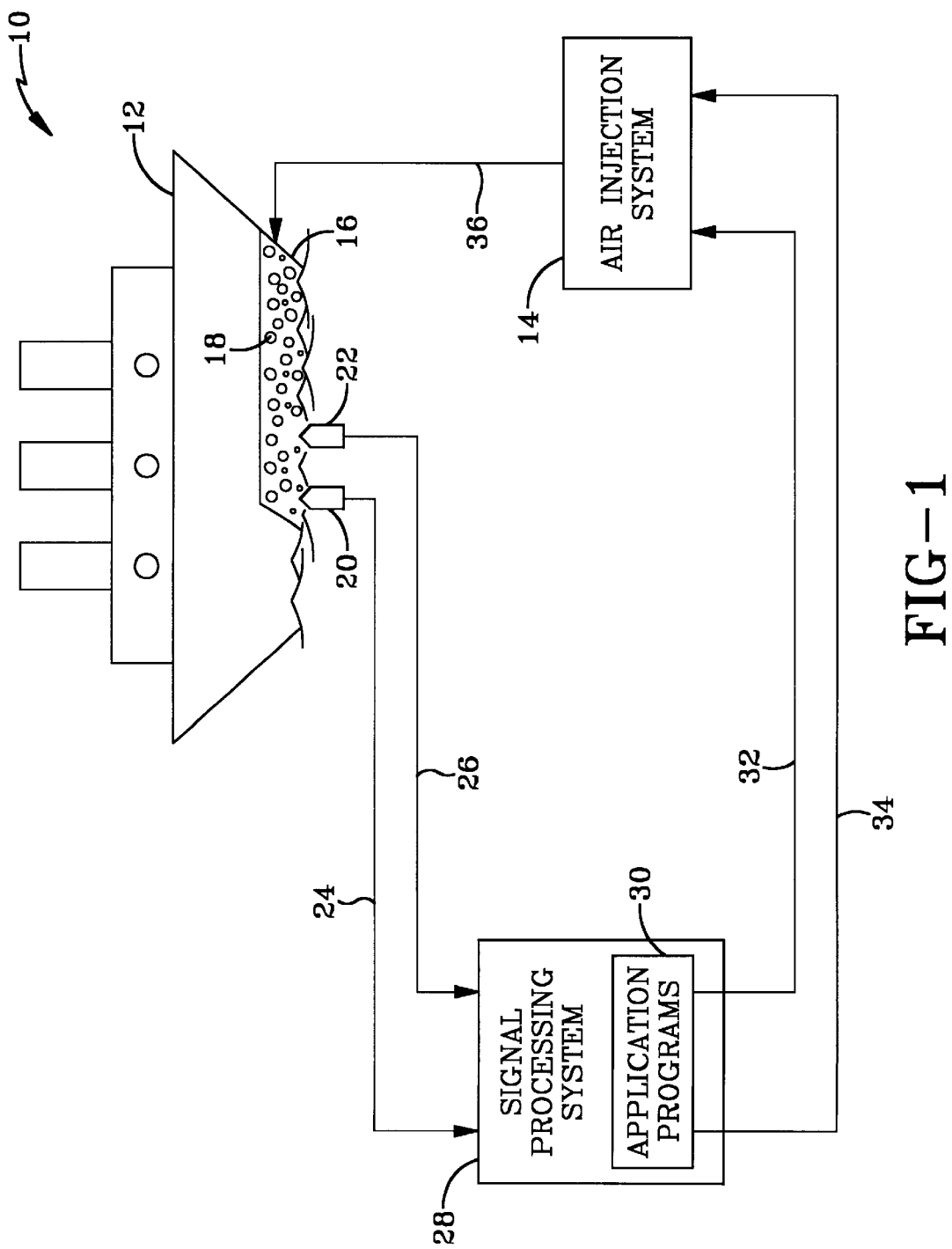
FIG. 1 is a block diagram of the present invention.

With reference to the drawings, there is shown in FIG. 1 a block diagram of system 10 for reducing the drag to which a marine vessel 12 may be subjected. The marine vessel 12 has its lower surface come into contact with the fluid, such as water, in which it moves and, more importantly, with a boundary layer of the fluid which is a very thin layer of fluid that propagates near the surface of the vessel and has a zero velocity at the surface.

The system 10 comprises an air injection system 14 coupled to the boundary layer and has means for varying the bubble size of the fluid injected into the boundary layer along with the flow rate of the fluid injected into the boundary layer. The air injection system 14 injects air through sliding plates 16 preferably having perforations 18, and the plates 16 are located along the wall of the hull in which the boundary layer is present. Further, it is preferred that the air injection system be located along the wall of the boundary layer and placed with respect to the stream wise direction of the flow of fluid along the hull.

Air flow injection systems used for reducing drag in marine vessels are known and two of such systems are disclosed in the previously mentioned U.S. Pat. Nos. 5,575,232 ('232) and 5,613,456 ('456) both of which are herein incorporated by reference. The air injection system 14 has many of the features of the '456 patent and is to be further discussed hereinafter with reference to FIG. 2.

The system 10 of FIG. 1, further comprises a plurality of sensors 20 and 22 each having an electrical output and interposed in said boundary layer. The sensor 20 detects the flow rate of the boundary layer, whereas the sensor 22 detects the pressure of the boundary layer. As will be described hereinafter, the information derived from the outputs of sensors 20 and 22, sometimes referred to herein as measurement probes, is used to determine the size of bubbles flowing in the boundary layer. The output signals of sensors 20 and 22 are respectively placed on signal paths 24 and 26 both of which are routed to a signal processor 28.

Signal processor 28 is responsive to application programs 30 which determine the rate of change of a chaotic radius (CR) which represents a differential radius (DR) having a range which controls the bubble size and the flow rate of fluid injected into the boundary layer. The application programs 30, by way of signal processor 28, provides signals on signal paths 32 and 34 which are routed to the air injection system 14 that responds to the commands thereon and controls the bubble size and the flow rate interjected into the boundary layer by way of path 36.

The system 10, in particular, the application programs 30, utilize novel non-linear signal processing methods, derived from the theories of information and nonlinear oscillations (chaos) to control the turbulent boundary layer of marine vessel 12 for reducing drag. Some of the principles used in the practice of the present invention related to marine vessels are similar to some of the principles disclosed in U.S. Pat. No. 5,730,144 related to the efficiency of cardioversion and which is herein incorporated by reference.

The non-linear entries used in the practice of the present invention, namely the chaotic radius and differential radius and variants thereof (to be described hereinafter), when operated on the original turbulent boundary layer data obtained from measurement probes 20 and 22 mounted along the hull of a marine vessel 12, provide automatic and precise detection markers for increase or decrease in drag based on a prescribed fluid (i.e., air) injection and flow rate in the boundary layer. The injected parameter are provided by the air injection system 14 in response to the signals applied by signal processing system 28 onto signal paths 32 and 34. The advantage of this feature of the present invention is to obtain an optimal mixture of injection (bubble size) and flow rate parameters for minimizing the drag of a marine vessel 12 and thereby maximizing the vessel's fuel consumption efficiency. The air injection system 14 may be further described with reference to FIG. 2.

Figure 2:
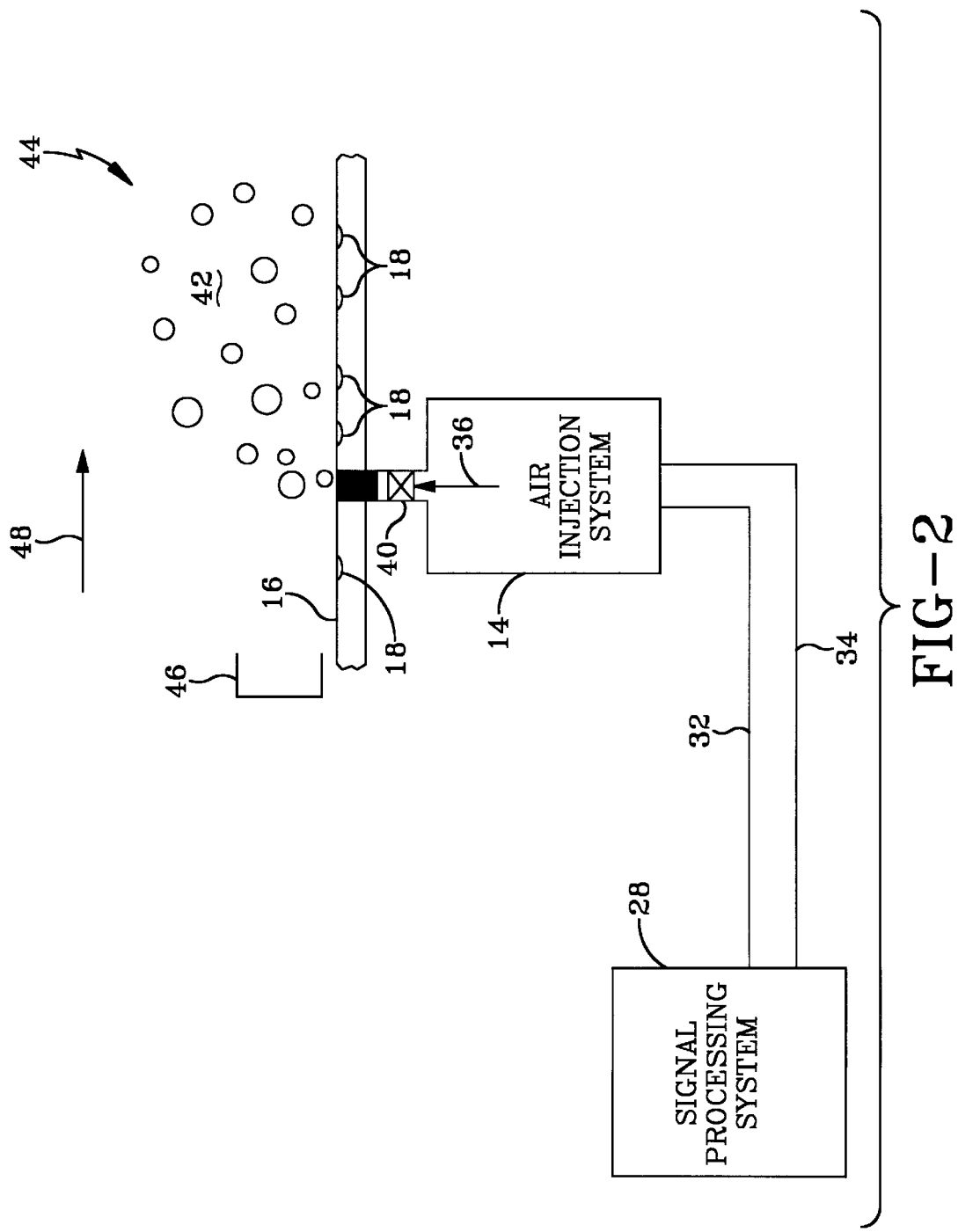
FIG. 2 is a schematic showing the interface between the air injection system of FIG. 1 and the boundary layer related to the present invention.

FIG. 2 illustrates the air injection system 14, in particular, control line 36 controlling a valve 40 operatively connected to the sliding plate 16 and generating bubbles 42 into a fluid 44 having a boundary layer generally shown as 46. To reduce drag as the liquid 44 flows in a general direction as shown by arrow 48, bubbles 42, especially micro-bubbles, must be positioned within the boundary layer as shown by 46. Bubbles 42 are first introduced into the liquid 44 from a gas reservoir within the air injection system 14. The gas is metered out and controlled by the valve 40 in response to the signal on control line 36. The gas in gas reservoir 20 then passes through a porous surface, in particular, the perforations 18 which introduces the bubbles 42 into the liquid 44. In the preferred embodiment, porous surface of the sliding plate 16 is manufactured from sintered metal, as is well known in the art, providing pores of nominal 50 micron approximately minimum size. This allows the bubbles 42 to be of a small size, preferably about 50 microns or more in diameter, which is preferential for drag reduction. The bubbles 42 then flow in a direction generally indicated by arrow 48 along the surface of the vessel 12.

A primary feature of the present invention is to determine the degree of entropy in the boundary layer 46 for assessing the parameters for reducing the drag of the marine vessel 12. The entropy quantity is used as a means for determining the amount of friction within the boundary layer 46. The entropy parameter is used for similar determinations. For example, a pendulum without friction exhibits perfect oscillatory behavior with zero entropy. A process without friction has no entropy change. With friction there is entropy. A minimum entropy for a given flow rate at the boundary layer 46 defines the optimum condition used by the system 10 for reducing drag.

The present invention, in particular, the application programs 30 perform realtime non-linear analysis diagnostics of time series recordings of the boundary layer wall pressures or nearfield velocities. Specifically, as to be further described hereinafter, the application programs 30 calculates the differential radius (DR) such that if a specified level of the DR is reached or exceeded (i.e., high entropy), then an adjustment of the boundary layer control parameters (namely, flow rate and/or bubble size) is accomplished by the air injection system 14. Control parameter adjustments are made based on both historical (default) and realtime data collected from a particular marine vessel and particular sensitivities to DR that may form part of the database of the application programs 30.

The DR quantity used by the application program 30 is of particular importance to the present invention. The DR quantity is in itself based on the topological phase space reconstruction of the flow parameter orbit (in this particular case, pressure or velocity respectively provided by the output signals of sensors 22 and 20). The phase space reconstruction is obtained using time series. From a one-dimensional time series (e.g., of the pressure or velocity), a d-dimensional set of vectors is obtained from a sequence of integral time delays of the observations given below by equation (1):

$$y(n)=[p(n), p(n+T), p(n+2T), \ldots p(n+(d-1)T)] \quad (1)$$

where:

p(n) is the original time series datum at time n.

p(n+iT) is the datum offset by a delay variable iT,i=1,2, . . . k.

p(n+(d−1) T) is the datum offset by time delay (d−1)T.

d is the embedding dimension, and n is the index for the time series datum (n=1,2,3 . . . N) and the number of indices, N, is a selectable quantity.

In the practice of the present invention in performing the phase space embedding shown with reference to equation (1), the initial task is to determine values for T and d of equation (1). Moreover, one must ensure the time series of equation (1) has been sampled at a sufficiently high rate such that the time between sample points is shorter than the most significant eddy turn over rates and associate harmonics, sometimes referred to as a small whirlpool, associated with the current of water 44 running contrary to the main current of water indicated by directional arrow 48 of FIG. 2 related to the boundary layer 46.

The geometric basis for underlying phase space reconstruction, associated with the present invention, is that starting with a 1-dimensional singular variable time series, such as that of equation (1), one is often able to reconstruct the multivariate state space in which the phase-space structure is observed. Practically, one observes in three dimensions although mathematically, in principle, one can compute up to as many dimensions as modern-day computers will reasonably allow. When one views three dimensionally "chaotic attractors" (known in the art) with defined structure, one often observes a distortion of the multivariate structure of a certain higher dimension projected onto a lower (3-dimensional) observation space. Even with the distortion, there remains observable underlying structure, and it is an important consideration in that systems whose computed dimensions are double and triple the observation space in which one views their orbits, show observable features that distinguish them apart.

The technique that the present invention, in particular the application programs 30, employs for computing the minimum embedding dimension is based on the feature that when points of higher dimension are projected down to a space of lower dimension, there are overlapping orbits in the low dimensional space. The present invention considers the reverse of this situation. More particularly, as one progresses from low to higher dimensions, one would reasonably expect neighboring points to separate apart. Thus, the technique that the present invention employs is to start with one dimension and successively unfold to higher and higher dimensions, while keeping track of the percentage of nearest neighbors (to be described hereinafter), that spread apart at each integral increase of dimension. The practice of the present invention has added enough additional coordinates when all points near each other are close for dynamical reasons rather than by projection from a higher dimension. One, proceeds by determining in dimension "d" which points obtained from the time delays into vectors as above are the nearest neighbors ynn(n) of the point y(n), where ynn(n) is computed using equation (2) given below:

$$ynn(n)=[vnn(n), vnn(n+T), \ldots vnn(n+(d-1)T)] \quad (2)$$

The practice of the present invention determines whether or not these points of equation (2) remain close in dimension (d+1) where the vector y(n) is augmented by a component v(n+dT) and the quantity ynn(n) is augmented by vnn(n+dT). For small distances the nearest neighbors are true neighbors. For large distances the nearest neighbors are false neighbors which arrived near each other by projection. When the percentage of false neighbors drops to zero, the practice of the present invention has unfolded the chaotic attractor onto a practical dimensional space defined by the minimum embedding dimension of equation (1). The phase space reconstruction is practical in the sense that one optimizes dynamical reconstruction of the signal of interest, such as the pressure or velocity signal on signal paths 26 and 24, respectively, while minimizing computer processing of the signal processor 28.

In the practice of the present invention, it has been determined that it is not always necessary to model or process data in the exact dimension of the system 10. Frequently, lower projections are used which can provide equally useful results. For data processing of the turbulent boundary layer pressure or velocity fluctuations, such as related to the present invention, a method for computing the differential radius at successively higher dimensions and complementary to the aforementioned false neighbor unfolding technique, may be employed. The important element of this approach, related to the practice of the present invention, is to seek out a system invariant, that is parameters that do not change with increasing dimension.

Non-linear systems, such as those related to boundary layers associated with the present invention, in the parameter regime where the orbits are chaotic are known to generate entropy, which is of importance to the present invention as previously discussed. One quantitative measure of the entropy is the average mutual information (AMI). A second quantitative measure of the entropy is the differential radius (DR).

The average mutual information (AMI) quantifies the information theoretic properties of chaotic systems finding application to the present invention, in particular to the application programs 30. The average mutual information (AMI) answers the question: If one collects measurement data in the form of a time series, p(n), such that of equation (1), where p(n)=p(t+ndt) and where t is the start time, dt is the time between samples, and n is the sample number, then how much information (in bits) does one gather from a measurement at time Tdt later on, namely at time p(n+T). The answer to this question is of particular importance to the signal processor 28 handling the digital quantities of the application programs 30. The informational theoretic answer to this question requires the distribution of measurements p(n) and p(n+T) over the set of measured data and the joint distribution of measurements of these two quantities, p(n) and p(n+T). The first of these distributions if P(p(n)), the second is P(p(n+T), and the third is P(p(n),p(n+T)). The mutual information between measurements may be expressed by equation (3) given below:

$$\ln [P(p(n),p(n+T))/P(p(n+T))] \quad (3)$$

where ln is a natural logarithm. For N observations, the average over all measurements is the AMI which is a function of the delay parameter T. Letting AMI=I(T), one obtains equation (4) given below:

$$I(T)=I(T1)+I(T2)+\ldots I(TN) \text{ or } I(T)=(Ti) \text{ where } I=1,2 \ldots N \quad (4)$$

Alternatively, equation (4) may be expressed as equation (5) given below:

$$I(Ti)=P(p(i),p(+T))*ln[(P(p(n),p(n+T)/P((p(n))P(p(n+T))] \quad (5)$$

For equation (5), it should be noted that for independent measurements p(n) and p(n+T), each term in the above sum of equation (5) vanishes due to factorization of the joint probability P(a,b)=P(a)P(b). One would naturally expect two measurements to become independent for very large values of T since chaotic signals rapidly lose memory of earlier entries on their orbits. For the case T=O, I(O) is large, indicative of the full knowledge of the measurements. In the general case, I(T)>O, and one seeks, in the practice of the present invention, for an intermediate value where I(T) is neither too large or too small. Finding such a value of T determines independent measurements p(n) and p(n+T) in a nonlinear sense. The nonlinear prescription for choosing such a value for T, is to select the first minimum of I(T). This is done in the practice of the present invention by choosing the first zero-crossing of the auto correlation function, often, used in linear analysis and known in the art. In the practice of the present invention, it has been determined that any value of T near the first minimum of I(T) suffices, and oftentimes T is selected as a percentage of the zero crossing of the auto correlation.

The second quantitative measurement employed by the present invention for quantification of the entropy, and which is of particular importance to the present invention, is the differential radius (DR), for it is the DR quantity which is preferably used to measure the entropy associated with the boundary layer 46 and hence preferably provides a regulatory mechanism for fluid injection into the boundary layer 46 by means of the air injection system 14. Once an appropriate phase space reconstruction has been obtained using the hereinbefore given descriptions, the DR is derived from a quantity which is herein defined as the chaotic radius (CR) and which may be further described with reference to FIG. 3.

Figure 3:
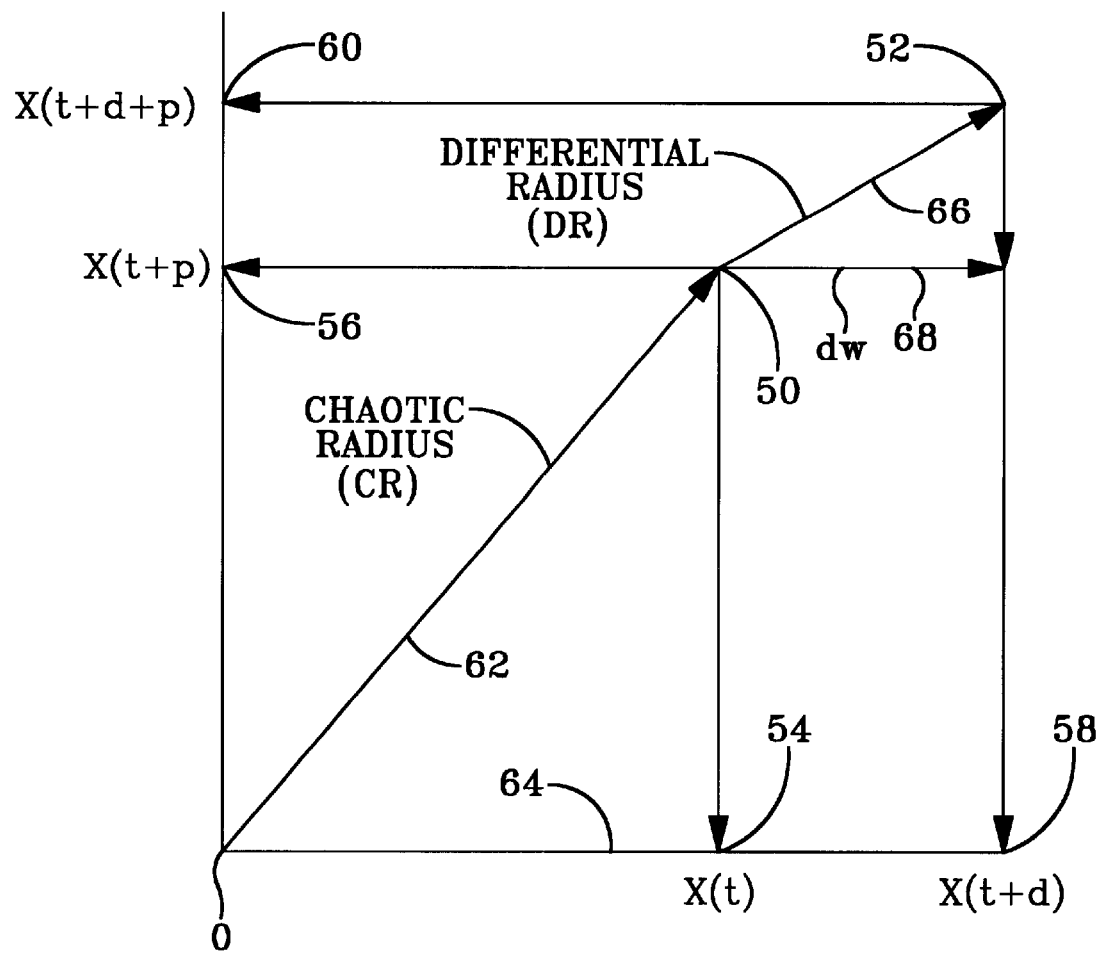
FIG. 3 is a diagrammatic illustration of obtaining the chaotic radius (CR) and differential radius (DR) parameters of the present invention.

FIG. 3 is an illustration related to the chaotic and differential radii parameters of the present invention. More particularly, FIG. 3 illustrates the points yielded from a 1-dimensional time series phase space reconstruction associated with that of equation (1). Typically, FIG. 3 illustrates points 50 and 52 respectively associated with the chaotic radius and the differential radius (DR), sometimes referred to as (dr). Point 50 is defined by X quantity 54 having terms X(t) and Y quantity 56 having terms X(t+p). Point 52 is defined by X quantity 58 having terms X(t+d) and Y quantity 60 having terms X(t+d+p). The terms d and p respectively represent the smallest time sample associated with gathering the data of FIG. 3 and a delay period for gathering the data of FIG. 3.

Further, FIG. 3 illustrates vectors quantities r(62), w(64), dr(66), and dw(68). The definition for the vector quantities shown in FIG. 3 are given in Table 1. It should be noted that the basis for detecting chaotic dynamics in a turbulent boundary layer upon which both the chaotic radius (CR) and the differential radius (DR) are predicated was first described in my U.S. Pat. No. 5,365,490 entitled: "Method And System For Reducing Drag On A Body Moving Through A Fluid Medium." This U.S. Patent is incorporated by reference in subject patent application.

TABLE 1
CHAOTIC RADIUS (r) AND CHAOTIC FREQUENCY (w) (2-D):

$$r=[X(t)^2+X(t+p)^2]1/2$$

$$w=\arctan [X(t+p)/X(t)]$$

DIFFERENTIAL RADIUS (dr) AND DIFFERENTIAL FREQUENCY (dw) (2-D):

$$dr=[ [X(t+d)-X(t)]^2+[X(t+d+p)-X(t+p)]^2]^{1/2}$$

$$dw=\arctan [ [X(t+d+p)-X(t+p)]/[X(t+d)-X(t)] ]$$

Variant of DIFFERENTIAL RADIUS (dr) (2-D):

$$dr=r(i+1)-r(i),$$

i is time index

From FIG. 3, and Table 1, it is seen that the chaotic radius (r), sometimes referred to as CR, is obtained by drawing a line (62) from a given point (50) in the phase space to a known reference point, such as the origin (O shown in FIG. 3) which is typically selected as a point of reference. It should be noted that for a phase space having a 2- or 3-dimensions in the usual Euclidean sense, or the line to the origin may be a hyper-line if the extension is based on a four or higher dimensional phase space reconstruction. FIG. 3 represents a 2-dimensional (2-D) illustration.

For the case illustrated in FIG. 3, the chaotic radius (r) is computed as a hypotenuse of a right triangle in the sense of Euclidean. The chaotic radius (r) for higher dimensions (i.e., hyper-triangles) are computed by extension of the sum of squared variables in the brackets for the formula for chaotic radius (r) shown in Table 1. The quantity differential radius (dr) is computed simply as the time of change of the chaotic radius (r) quantity. It should be noted that the differential radius (dr) quantity is a natural measurement of the changing state of a dynamical system. As previously mentioned, for example, a pendulum without friction exhibits perfect oscillatory behavior with zero entropy. In the present invention, the chaotic radius (r) is a constant and the differential radius (dr) is zero for such zero entropy. If the system is violently disturbed, the differential radius (dr) quantity will rise in proportion to the increase in entropy due to disruptive forces of the system. It is the differential radius (dr) quantity that is used by the present invention to ascertain the amount of disruption of the otherwise laminar fluid motion in the boundary layer 46 that allows the present invention to regulate and control the drag within the boundary layer.

For example, in the practice of the present invention it has been determined that if the differential radius (dr) exceeds a prescribed threshold level, then bubble size and flow rate adjustments are made until the dr is reduced below the prescribed threshold level, so as to reduce the turbulence in the boundary layer 46 and, thus, the drag.

It is now appreciated that the practice of the present invention provides for non-linear signal processing methods utilizing non-linear oscillations (chaos) used to determine turbulent boundary layers that are then controlled for reducing drag. The present invention by determining the bubble size and the flow parameters for minimizing the marine vessels drag maximizes the vessels fuel consumption efficiency.

Although the present invention has been described for drag reduction of marine vessels, it should be appreciated that the practice of the present invention applies to any situation requiring moderating and regulation of boundary layer dynamics and applies to all marine vessels.

It will be understood that various changes in the details, steps and arrangements of parts, which have been herein described and illustrated in order to explain the nature of the invention, may be made by those skilled in the art within the principle and scope of the invention as expressed in the appending claims.

What is claimed is:

1. A system for reducing drag to which a marine vessel may be subjected, said marine vessel being in contact with a boundary layer as it moves through a fluid, said system comprising:

an air flow system coupled to said boundary layer;

means for varying a bubble size interjected into said boundary layer and the flow rate of said boundary layer, said means for varying the bubble size including a plurality of sensors each having an output and interposed in said boundary layer with said sensors detecting the flow rate of said boundary layer and pressure thereof and the size of bubbles flowing in said boundary layer; and a signal processor for receiving said outputs of said sensors and being responsive to application programs;

said application programs determining the time rate of change of a chaotic radius (CR) which represents a differential radius (DR) having a range which controls said bubble size and said flow rate that is interjected in said boundary layer wherein said drag has a predetermined limit and said range of differential radius (DR) has a threshold value corresponding to said predetermined limit.

2. The system according to claim 1 wherein said chaotic radius is determined by the following relationship:

$$CR = \sqrt{[X(t)^2 + X(t+p)^2]}$$

where all of terms X, t and p are of a time series having an embedded dimension d, X(t) defining a point of the time series representative of a first given time, and p being representative of a preselected time interval delay period.

3. The system according to claim 2, wherein said boundary layer manifests entropy and said differential radius is representative of said entropy.

4. The system according to claim 3, wherein said terms X, t and p of said time series having an embedded dimension d, said size of said bubble, and said flow rate are selected to reduce said entropy which correspondingly reduces friction within said boundary layer.

5. The system according to claim 2, wherein said embedded dimension, d, is indicative of one of said flow rate and pressure parameters of said boundary layer.

6. The system according to claim 2, wherein said quantity p representative of a preselected time interval delay period is obtained by said application programs utilizing average mutual information from time series of samples.

7. The system according to claim 2 wherein said quantity p representative of a preselected time interval delay period is obtained by said application programs utilizing global false nearest neighbor information from time series of samples.

8. The system according to claim 1 wherein said application programs utilize non-linear control techniques derived from non-linear dynamic and chaos principles.

9. The system according to claim 1 wherein said means for varying bubble size and flow rate injected into said boundary layer comprises an air injection system located at a wall of a hull of said marine vessel along which said boundary layer is present.

10. The system according to claim 9 wherein said air injection system injects air through sliding perforated plates located along said wall of said hull of said marine vessel and said air injection system is located on said wall on said boundary layer and placed with respect to the stream wise direction of flow of fluid along said hull.

11. A method for reducing drag to which a marine vessel may be subjected, said marine vessel being in contact with a boundary layer as it moves through a fluid, said method comprising the steps of:

providing an air flow system coupled to said boundary layer;

providing means for controlling a bubble size interjected into said boundary layer and the flow rate of said boundary layer, said means for controlling bubble size further comprising a plurality of sensors each having an output and interposed in said boundary layer with said sensors detecting the flow rate of said boundary layer and pressure thereof and the size of bubbles flowing in said boundary layer; and providing a signal processor for receiving said outputs of said sensors and for being responsive to application programs, said application programs determining the time rate of change of a chaotic radius (CR) which represents a differential radius (DR) having a range which controls said bubble size and said flow rate that is interjected into said boundary layer.

12. The method according to claim 11 which further includes calculating said chaotic radius is determined by the following relationship:

$$CR = \sqrt{[X(t)^2 + X(t+p)^2]}$$

where all of terms X, t and p are of a time series having an embedded dimension d, X(t) defining a point of the time series representative of a first given time, and p being representative of a preselected time interval delay period.

13. The method according to claim 11 wherein said drag has a predetermined limit and said range of said differential radius (DR) has a threshold value corresponding to said predetermined limit.

14. The method according to claim 13 wherein said boundary layer manifests an entropy and said differential radius is representative of said entropy.

15. The method according to claim 12 which includes calculating said terms X, t and p of said time series having an embedded dimension d, said size of said bubble, and selecting said flow rate to reduce said entropy which correspondingly reduces friction within said boundary layer.

16. The method according to claim 12 wherein said embedded dimension, d, is indicative of one of said flow rate and pressure parameters of said boundary layer.

17. The method according to claim 12 which involves the step of obtaining said quantity p representative of a preselected time interval delay period by said application programs utilizing average mutual information from time series of samples.

18. The method according to claim 11 which involves utilizing non-linear control techniques derived from non-linear dynamic and chaos principles for said application programs.

19. The method according to claim 11 which involves varying bubble size and flow rate injected into said boundary layer comprises an air injection system arranged to be located at a wall of a hull of said marine vessel along which said boundary layer is present.

20. The method according to claim 11 further comprising the step of providing sliding perforated plates and interposing said sliding perforated plates between said provided air injection system and said wall of said hull of said marine vessel.

* * * * *